(12) United States Patent
Hashimoto et al.

(10) Patent No.: US 11,377,084 B2
(45) Date of Patent: Jul. 5, 2022

(54) VEHICLE CONTROLLER, VEHICLE CONTROL SYSTEM, VEHICLE LEARNING DEVICE, VEHICLE LEARNING METHOD, AND MEMORY MEDIUM

(71) Applicant: TOYOTA JIDOSHA KABUSHIKI KAISHA, Toyota (JP)

(72) Inventors: Yosuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 98 days.

(21) Appl. No.: 17/064,034

(22) Filed: Oct. 6, 2020

(65) Prior Publication Data

US 2021/0114579 A1    Apr. 22, 2021

(30) Foreign Application Priority Data

Oct. 18, 2019 (JP) .............................. JP2019-191095
Dec. 23, 2019 (JP) .............................. JP2019-231144

(51) Int. Cl.
| | |
|---|---|
| *B60W 10/06* | (2006.01) |
| *G06K 9/62* | (2022.01) |
| *G07C 5/08* | (2006.01) |
| *B60W 50/04* | (2006.01) |

(52) U.S. Cl.
CPC .......... *B60W 10/06* (2013.01); *B60W 50/045* (2013.01); *G06K 9/6262* (2013.01); *G07C 5/0841* (2013.01); *B60W 2510/0604* (2013.01)

(58) Field of Classification Search
CPC .............. B60W 10/06; B60W 50/045; B60W 2510/0604; G06K 9/6262; G07C 5/0841
USPC ....................................................... 701/102
See application file for complete search history.

(56) References Cited

U.S. PATENT DOCUMENTS

| | | | |
|---|---|---|---|
| 5,410,477 A | 4/1995 | Ishii et al. | |
| 6,549,815 B1 | 4/2003 | Kaji | |

FOREIGN PATENT DOCUMENTS

| | | |
|---|---|---|
| JP | 04-293626 A | 10/1992 |
| JP | 10-254505 A | 9/1998 |
| JP | 2000-250604 A | 9/2000 |
| JP | 2016-006327 A | 1/2016 |
| JP | 2019-144748 A | 8/2019 |

*Primary Examiner* — Mahmoud Gimie
(74) *Attorney, Agent, or Firm* — Oblon, McClelland, Maier & Neustadt, L.L.P.

(57) ABSTRACT

An update process updates relationship defining data by inputting, to a predetermined update map, a state of a vehicle obtained by a state obtaining process, a value of an action variable used to operate an electronic device, and a reward corresponding to an operation of an electronic device. A range in which an operation process uses, as the action variable, a value different from a value that maximizes an expected return related to the reward is defined as a return non-maximizing range. In a case in which a degree of deterioration of the vehicle is greater than or equal to a predetermined degree, a changing process changes the return non-maximizing range to a side on which the return non-maximizing range is expanded as compared to a case in which the degree of deterioration is less than the predetermined degree.

9 Claims, 7 Drawing Sheets

VEHICLE CONTROLLER, VEHICLE CONTROL SYSTEM, VEHICLE LEARNING DEVICE, VEHICLE LEARNING METHOD, AND MEMORY MEDIUM

BACKGROUND

1. Field

The present disclosure relates to a vehicle controller, a vehicle control system, a vehicle learning device, and a vehicle learning method.

2. Description of Related Art

For example, Japanese Laid-Open Patent Publication No. 2016-6327 discloses a controller that controls a throttle valve, which is an operated unit of an internal combustion engine mounted on a vehicle, based on a value processing an operation amount of an accelerator pedal with a filter.

The above-described filter is required to set the operation amount of the throttle valve of the internal combustion engine mounted on the vehicle to an appropriate operation amount in accordance with the operation amount of the accelerator pedal. Thus, adaptation of the filter requires a great number of man-hours by skilled workers. In this manner, adaptation of operation amounts of electronic devices on a vehicle in accordance with the state of the vehicle requires a great number of man-hours by skilled workers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the present disclosure will now be described.

Aspect 1. A vehicle controller is provided that includes an execution device and a memory device. The memory device stores relationship defining data that defines a relationship between a state of a vehicle and an action variable related to an operation of an electronic device mounted on the vehicle. The execution device is configured to execute: a state obtaining process that obtains the state of the vehicle at each moment based on a detection value of a sensor at each moment; an operation process that operates the electronic device based on a value of the action variable, the value of the action variable being determined by the relationship defining data and the state of the vehicle obtained by the state obtaining process; a reward calculating process that provides, based on the state of the vehicle obtained by the state obtaining process, a greater reward when a characteristic of the vehicle meets a standard than when the characteristic of the vehicle does not meet the standard; an update process that updates the relationship defining data by inputting, to a predetermined update map, the state of the vehicle obtained by the state obtaining process, the value of the action variable used to operate the electronic device, and the reward corresponding to the operation of the electronic device; a deterioration variable obtaining process that obtains a deterioration variable, the deterioration variable indicating a degree of deterioration of the vehicle; and a changing process, wherein a range in which the operation process uses, as the action variable, a value different from a value that maximizes an expected return related to the reward is defined as a return non-maximizing range, and, in a case in which the degree of deterioration of the vehicle is greater than or equal to a predetermined degree, the changing process changes the return non-maximizing range to a side on which the return non-maximizing range is expanded as compared to a case in which the degree of deterioration is less than the predetermined degree. The update map outputs the updated relationship defining data so as to increase the expected return of a case in which the electronic device is operated in accordance with the relationship defining data.

This configuration calculates a reward that accompanies operation of the electronic device, so as to acquire the type of the reward obtained through that operation. Then, the relationship defining data is updated based on the reward, using the update map according to reinforcement learning. The relationship between the state of the vehicle and the action variable thus can be set to a relationship suitable for traveling of the vehicle. This reduces the man-hours required for skilled workers when the relationship between the state of the vehicle and the action variable is set to a relationship suitable for traveling of the vehicle.

When the action that maximizes an expected return, which is determined by the reinforcement learning, converges, the action that maximizes the expected return should be always selected rather than indiscriminately continuing a search. Such selection of such the action is favorable for performing control to achieve a target characteristic of the vehicle. However, when the vehicle deteriorates, the action that maximizes the expected return may change. In this regard, in a case in which the degree of deterioration of the vehicle is greater than or equal to a predetermined degree, the above-described configuration expands the return non-maximizing range, as compared to a case in which the degree of deterioration is less than the predetermined level. This allows the reinforcement learning to discover a value of the action variable that is suitable for the deteriorated vehicle.

The state of the vehicle obtained through the state obtaining process preferably includes at least a value that changes in a shorter time than the value of the deterioration variable does.

Aspect 2. In the vehicle controller according to Aspect 1, the changing process includes a process that increases the return non-maximizing range from zero to a range greater than zero.

With the above-described configuration, the return non-maximizing range is zero when the degree of deterioration is less than the predetermined degree. This prevents unnecessary searches from being performed.

Aspect 3. In the vehicle controller according to Aspect 2, the deterioration variable subdivides a case in which the degree of deterioration is less than a predetermined degree, using a quantity that is positively correlated with elapsed time. The changing process changes the return non-maximizing range from a first range to a third range via a second range as time elapses. The first range is greater than the second range and the third range. The third range is greater than the second range. In a case in which the degree of deterioration of the vehicle is greater than or equal to the predetermined degree, the changing process changes the return non-maximizing range to a side on which the return non-maximizing range is expanded from the second range to the third range.

With the above-described configuration, even when the vehicle deteriorates, the value of the action variable that maximizes the expected return is not expected to change significantly in relation to the value prior to the deterioration of the vehicle. In view of this, the third range is smaller than the first range in the above-described configuration. This increases the possibility that search will be performed only for a value of the action variable that may maximize the expected return for the deteriorated vehicle. The search is thus performed efficiently.

Aspect 4. A vehicle control system is provided that includes the execution device and the memory device in the vehicle controller according to any one of Aspects 1 to 3. The execution device includes a first execution device mounted on the vehicle and a second execution device that is different from an in-vehicle device. The first execution device is configured to execute at least the state obtaining process and the operation process. The second execution device is configured to execute at least the update process.

With the above-described configuration, the update process is executed by the second execution device. Thus, as compared to a case in which the update process is executed by the first execution device, the computation load on the first execution device is reduced.

The phrase "a second execution device that is different from an in-vehicle device" means that the second execution device is not an in-vehicle device.

Aspect 5. A vehicle controller is provided that includes the first execution device in the vehicle control system according to Aspect 4.

Aspect 6. A vehicle learning device is provided that includes the second execution device in the vehicle control system according to Aspect 4.

Aspect 7. A vehicle learning method is provided that includes: causing a computer to execute the state obtaining process, the operation process, the reward calculating process, the update process, the deterioration variable obtaining process, and the changing process in the vehicle controller according to any one of Aspects 1 to 3.

Aspect 8: A vehicle control method is provided that performs the various processes described in any one of Aspects 1 to 3 using an execution device and a memory device.

Aspect 9: A computer readable memory medium is provided that stores a vehicle control process causes an execution device and a memory device to perform the various processes described in any one of Aspects 1 to 3.

The method and the memory device have operational advantages similar to those of Aspect 1 above.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A vehicle controller 70 according to a first embodiment will now be described with reference to FIGS. 1 to 5.

Figure 1:
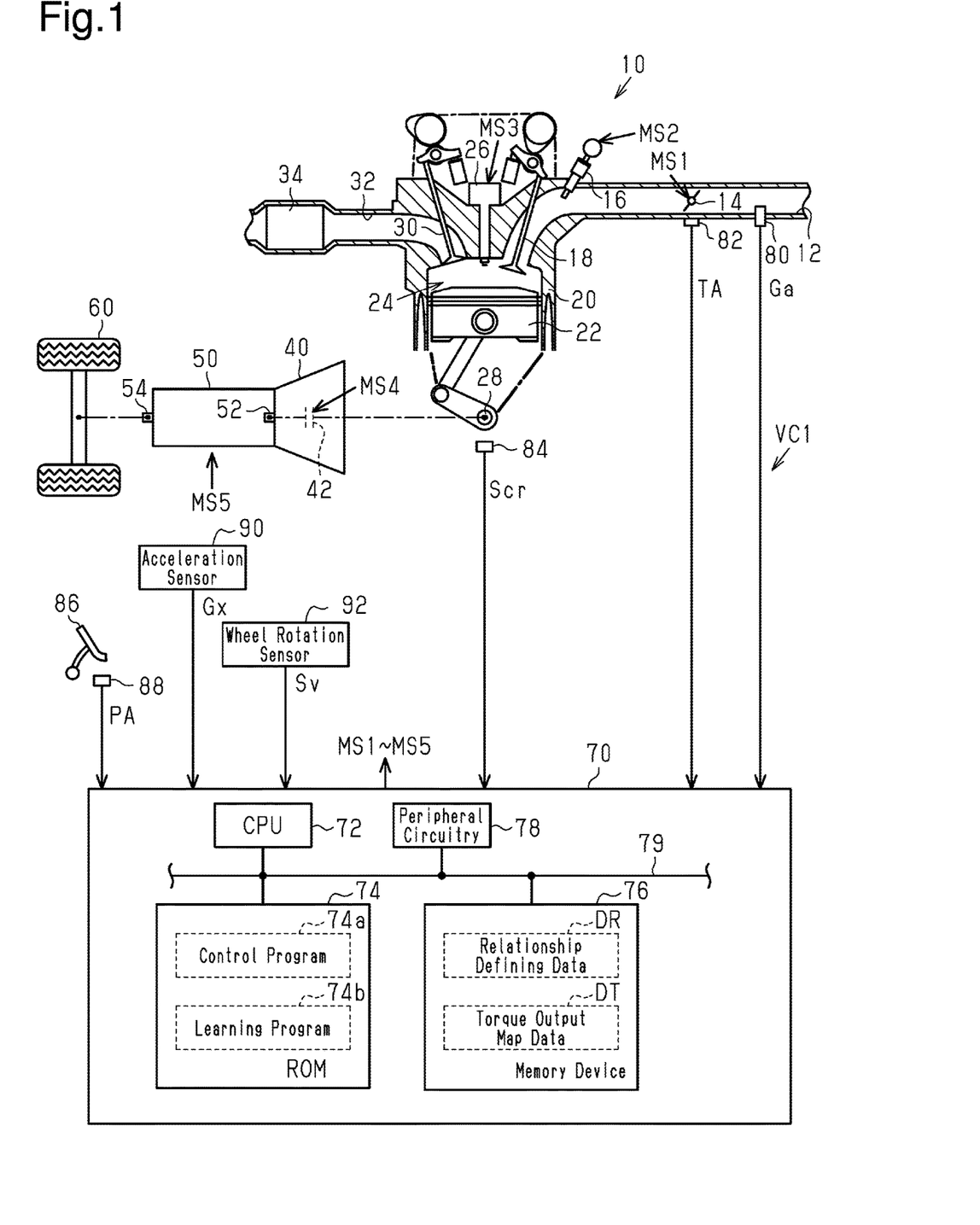
FIG. 1 is a diagram showing a controller according to a first embodiment and a drive system.

FIG. 1 shows the configuration of a drive system of a vehicle VC1 and the controller 70 according to the present embodiment.

As shown in FIG. 1, an internal combustion engine 10 includes an intake passage 12, in which a throttle valve 14 and a fuel injection valve 16 are arranged in that order from the upstream side. Air drawn into the intake passage 12 and fuel injected from the fuel injection valve 16 flow into a combustion chamber 24, which is defined by a cylinder 20 and a piston 22, when an intake valve 18 is opened. In the combustion chamber 24, air-fuel mixture is burned by spark discharge of an ignition device 26. The energy generated by the combustion is converted into rotational energy of a crankshaft 28 via the piston 22. The burned air-fuel mixture is discharged to an exhaust passage 32 as exhaust gas when an exhaust valve 30 is opened. The exhaust passage 32 incorporates a catalyst 34, which is an aftertreatment device for purifying exhaust gas.

The crankshaft 28 is mechanically couplable to an input shaft 52 of a transmission 50 via a torque converter 40 equipped with a lockup clutch 42. The transmission 50 variably sets the gear ratio, which is the ratio of the rotation speed of the input shaft 52 and the rotation speed of an output shaft 54. The output shaft 54 is mechanically coupled to driven wheels 60.

The controller 70 controls the internal combustion engine 10 and operates operated units of the engine 10 such as the throttle valve 14, the fuel injection valve 16, and the ignition device 26, thereby controlling the torque and the ratios of exhaust components, which are controlled variables of the internal combustion engine 10. The controller 70 also controls the torque converter 40 and operates the lockup clutch 42 to control the engagement state of the lockup clutch 42.

Further, the controller 70 controls and operates the transmission 50, thereby controlling the gear ratio, which is the controlled variable of the transmission 50. FIG. 1 shows operation signals MS1 to MS5 respectively corresponding to the throttle valve 14, the fuel injection valve 16, the ignition device 26, the lockup clutch 42, and the transmission 50.

To control the controlled variables, the controller 70 refers to an intake air amount Ga detected by an air flow meter 80, an opening degree of the throttle valve 14 detected by a throttle sensor 82 (throttle opening degree TA), and an output signal Scr of a crank angle sensor 84. The controller 70 also refers to a depression amount of an accelerator pedal 86 (accelerator operation amount PA) detected by an accelerator sensor 88 and an acceleration Gx in the front-rear direction of the vehicle VC1 detected by an acceleration sensor 90. Further, the controller 70 refers to an output signal Sv of a wheel rotation sensor 92, which detects a rotation angle of the driven wheels 60.

The controller 70 includes a CPU 72, a ROM 74, a nonvolatile memory that can be electrically rewritten (memory device 76), and peripheral circuitry 78, which can communicate with one another through a local network 79. The peripheral circuitry 78 includes a circuit that generates a clock signal regulating operations inside the controller 70, a power supply circuit, and a reset circuit.

The ROM 74 stores a control program 74a and a learning program 74b. The memory device 76 stores relationship defining data DR, which defines the relationship of the accelerator operation amount PA with a command value of the throttle opening degree TA (throttle command value TA*) and a retardation amount aop of the ignition device 26. The retardation amount aop is a retardation amount in relation to a predetermined reference ignition timing. The reference ignition timing is the more retarded one of the MBT ignition timing and the knock limit point. The MBT ignition timing is the ignition timing at which the maximum torque is obtained (maximum torque ignition timing). The knock limit point is the advancement limit value of the ignition timing at which knocking can be limited to an allowable level under the assumed best conditions when a large-octane-number fuel, which has a large knock limit value, is used. The memory device 76 also stores torque output map data DT. The torque output map data DT defines a torque output map. A rotation speed NE of the crankshaft 28, a charging efficiency η and the ignition timing are input to the torque output map, which in turn outputs a torque Trq.

Figure 2:
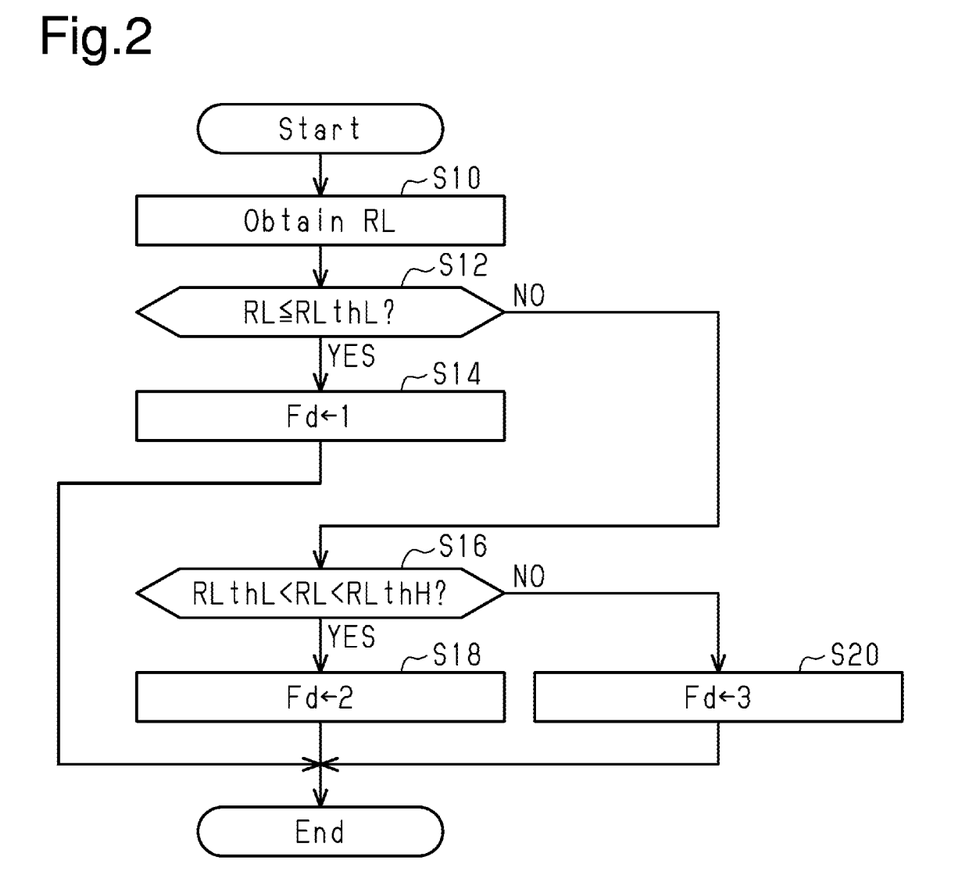
FIG. 2 is a flowchart showing a procedure of processes executed by the controller according to the first embodiment.

FIG. 2 shows a procedure of processes executed by the controller 70 of the present embodiment. The processes shown in FIG. 2 are implemented by the CPU 72 repeatedly executing the learning program 74b stored in the ROM 74, for example, at predetermined intervals. In the following description, the number of each step is represented by the letter S followed by a numeral.

In the series of processes shown in FIG. 2, the CPU 72 first acquires a traveled distance RL (S10). The traveled distance RL is calculated by the CPU 72 based on the output signal Sv of the wheel rotation sensor 92.

The CPU 72 then determines whether the traveled distance RL is less than or equal to a convergence determination value RLthL. When determining that the traveled distance RL is less than or equal to the convergence determination value RLthL, the CPU 72 assigns 1 to a deterioration flag Fd (S14). When making a negative determination in the process of S12, the CPU 72 determines whether the traveled distance RL is greater than the convergence determination value RLthL and less than a deterioration threshold RLthH (S16). When determining that the traveled distance RL is greater than the convergence determination value RLthL and less than the deterioration threshold RLthH (S16: YES), the CPU 72 assigns 2 to the deterioration flag Fd (S18). When making a negative determination in the process of S16, the CPU 72 assigns 3 to the deterioration flag Fd (S20).

When completing any of the processes of steps S14, S18, and S20, the CPU 72 temporarily suspends the series of processes shown in FIG. 2.

Figure 3:
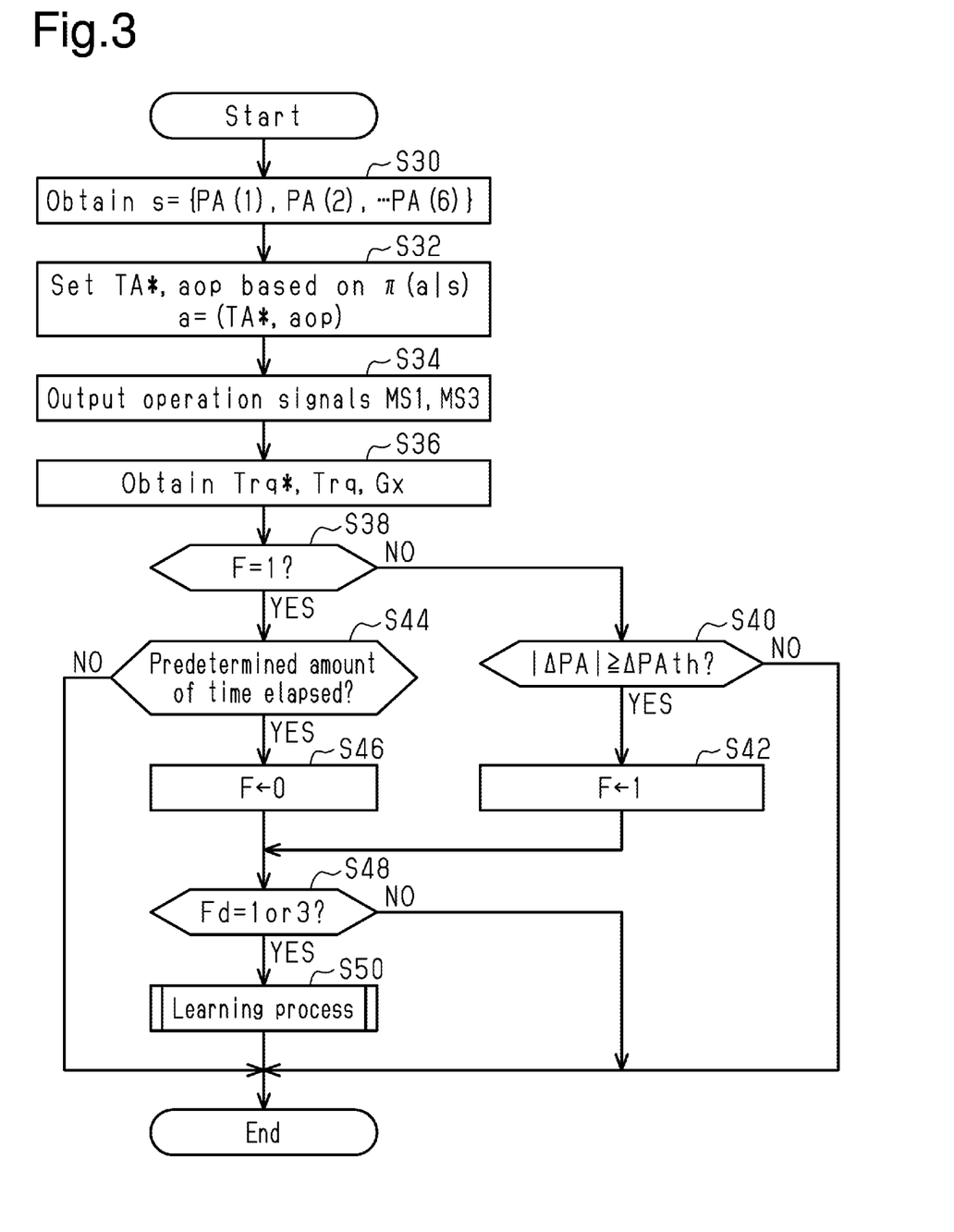
FIG. 3 is a flowchart showing a procedure of processes executed by the controller according to the first embodiment.

FIG. 3 shows a procedure of processes executed by the controller 70 of the present embodiment. The processes shown in FIG. 3 are implemented by the CPU 72 repeatedly executing the control program 74a and the learning program 74b stored in the ROM 74, for example, at predetermined intervals.

In the series of processes shown in FIG. 3, the CPU 72 first acquires, as a state s, time-series data including six sampled values PA(1), PA(2), . . . PA(6) (S30). The sampled values included in the time-series data have been sampled at different points in time. In the present embodiment, the time-series data includes six sampled values that are consecutive in time in a case in which the values are sampled at a constant sample period.

Next, in accordance with a policy 7E defined by the relationship defining data DR, the CPU 72 sets an action a, which includes the throttle command value TA* and the retardation amount aop corresponding to the state s obtained through the process of S30 (S32).

In the present embodiment, the relationship defining data DR is used to define an action value function Q and the policy 7C. In the present embodiment, the action value function Q is a table-type function representing values of expected return in accordance with eight-dimensional independent variables of the state s and the action a. When a state s is provided, the action value function Q includes values of the action a at which the independent variable is the provided state s. Among these values, the one at which the expected return is maximized is referred to as a greedy action. The policy π defines rules with which the greedy action is preferentially selected, and an action a different from the greedy action is selected with a predetermined probability.

Specifically, the number of the values of the independent variable of the action value function Q according to the present embodiment is obtained by deleting a certain amount from all the possible combinations of the state s and the action a, referring to human knowledge and the like. For example, in time-series data of the accelerator operation amount PA, human operation of the accelerator pedal 86 would never create a situation in which one of two consecutive values is the minimum value of the accelerator operation amount PA and the other is the maximum value. Accordingly, the action value function Q is not defined for this combination of the values of the accelerator operation amount PA. In the present embodiment, reduction of the dimensions based on human knowledge limits the number of the possible values of the state s defined by the action value function Q to a number less than or equal to 10 to the fourth power, and preferably, to a number less than or equal to 10 to the third power.

Next, the CPU 72 outputs the operation signal MS1 to the throttle valve 14 based on the set throttle command value TA* and retardation amount aop, thereby controlling the throttle opening degree TA, and outputs the operation signal MS3 to the ignition device 26, thereby controlling the ignition timing (S34). The present embodiment illustrates an example in which the throttle opening degree TA is feedback-controlled to the throttle command value TA*. Thus, even if the throttle command value TA* remains the same value, the operation signal MS1 may have different values. For example, when a known knock control system (KCS) is operating, the value obtained by retarding the reference ignition timing by the retardation amount aop is used as the value of the ignition timing corrected through feedback correction in the KCS. The reference ignition timing is varied by the CPU 72 in correspondence with the rotation speed NE of the crankshaft 28 and the charging efficiency η. The rotation speed NE is calculated by the CPU 72 based on the output signal Scr of the crank angle sensor 84. The charging efficiency η is calculated by the CPU 72 based on the rotation speed NE and the intake air amount Ga.

The CPU 72 obtains the torque Trq of the internal combustion engine 10, a torque command value Trq*, and the acceleration Gx (S36). The CPU 72 calculates the torque Trq by inputting the rotation speed NE and the charging efficiency η to the torque output map. The CPU 72 sets the torque command value Trq* in accordance with the accelerator operation amount PA.

Next, the CPU 72 determines whether a transient flag F is 1 (S38). The value 1 of the transient flag F indicates that a transient operation is being performed, and the value 0 of the transient flag F indicates that the transient operation is not being performed. When determining that the transient flag F is 0 (S38: NO), the CPU 72 determines whether the absolute value of a change amount per unit time ΔPA of the accelerator operation amount PA is greater than or equal to a predetermined amount ΔPAth. The change amount per unit time ΔPA simply needs to be the difference between the latest accelerator operation amount PA at the point in time of execution of S40 and the accelerator operation amount PA of the point in time that precedes the execution of S40 by a certain amount of time.

When determining that the absolute value of the change amount per unit time ΔPA is greater than or equal to the predetermined amount ΔPAth (S40: YES), the CPU 72 assigns 1 to the transient flag F.

In contrast, when determining that the transient flag F is 1 (S38: YES), the CPU 72 determines a predetermined amount of time has elapsed from the point in time of execution of the process of S42 (S44). The predetermined amount of time is an amount of time during which the absolute value of the change amount per unit time ΔPA of the accelerator operation amount PA remains less than or equal to a specified amount that is less than the predetermined amount ΔPAth. When determining that the predetermined amount of time has elapsed from the point in time of execution of S42 (S44: YES), the CPU 72 assigns 0 to the transient flag F (S46).

When the process of S42 or S46 is completed, the CPU 72 assumes that one episode has ended and determines whether the deterioration flag Fd is 1 or 3 (S48). When determining that the deterioration flag Fd is 1 or 3 (S48: YES), the CPU 72 updates the action value function Q through reinforcement learning (S50).

Figure 4:
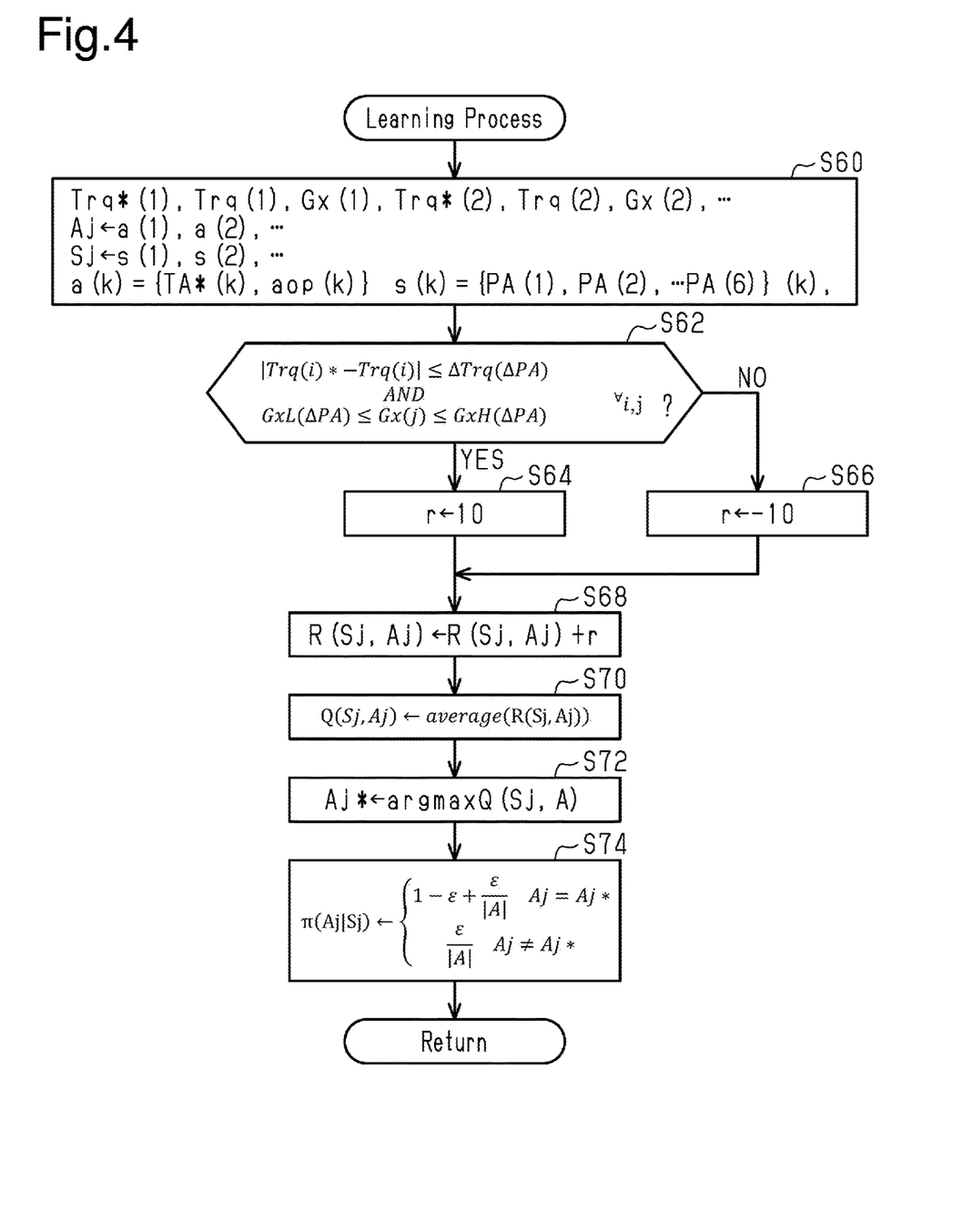
FIG. 4 is a flowchart showing a detailed procedure of some of the processes executed by the controller according to the first embodiment.

FIG. 4 illustrates the details of the process of S50.

In the series of processes shown in FIG. 4, the CPU 72 acquires time-series data including groups of sampled values of the torque command value Trq*, the torque Trq, and the acceleration Gx in the episode that has been ended most recently, and time-series data of the state s and the action a (S60). The time period of the most recent episode is a time period during which the transient flag F was continuously 0 if the process of S60 of FIG. 4 is executed after the process of S42 of FIG. 3. The time period of the most recent episode is a time period during which the transient flag F was continuously 1 if the process of S60 of FIG. 4 is executed after the process of S46 of FIG. 3.

In FIG. 4, variables of which the numbers in parentheses are different are variables at different sampling points in time. For example, a torque command value Trq*(1) and a torque command value Trq*(2) have been obtained at different sampling points in time. The time-series data of the action a belonging to the most recent episode is defined as an action set Aj, and the time-series data of the state s belonging to the same episode is defined as a state set Sj.

Next, the CPU 72 determines whether the logical conjunction of the following conditions (i) and (ii) is true: the condition (i) is that the absolute value of the difference between an arbitrary torque Trq belonging to the most recent episode and the torque command value Trq* is less than or equal to a specified amount ΔTrq; and the condition (ii) is that the acceleration Gx is greater than or equal to a lower limit GxL and less than or equal to an upper limit GxH (S62).

The CPU 72 varies the specified amount ΔTrq depending on the change amount per unit time ΔPA of the accelerator operation amount PA at the start of the episode. That is, the CPU 72 determines that the episode is related to transient time if the absolute value of the change amount per unit time ΔPA is great and sets the specified amount ΔTrq to a greater value than in a case in which the episode related to steady time.

The CPU 72 varies the lower limit GxL depending on the change amount per unit time ΔPA of the accelerator operation amount PA at the start of the episode. That is, when the episode is related to transient time and the change amount per unit time ΔPA has a positive value, the CPU 72 sets the lower limit GxL to a greater value than in a case in which the episode is related to steady time. When the episode is related to transient time and the change amount per unit time ΔPA has a negative value, the CPU 72 sets the lower limit GxL to a smaller value than in a case in which the episode is related to steady time.

Also, the CPU 72 varies the upper limit GxH depending on the change amount per unit time ΔPA of the accelerator operation amount PA at the start of the episode. That is, when the episode is related to transient time and the change amount per unit time ΔPA has a positive value, the CPU 72 sets the lower upper limit GxH to a greater value than in a case in which the episode is related to steady time. When the episode is related to transient time and the change amount per unit time ΔPA has a negative value, the CPU 72 sets the lower upper limit GxH to a smaller value than in a case in which the episode is related to steady time.

When determining that the logical conjunction of the condition (i) and the condition (ii) is true (S62: YES), the CPU 72 assigns 10 to a reward r (S64). When determining that the logical conjunction is false (S62: NO), the CPU 72 assigns −10 to the reward r (S66). The processes from S62 to S66 are designed to provide a greater reward when a standard related to drivability is met than when the standard is not met. When the process of S64 or S66 is completed, the CPU 72 updates the relationship defining data DR stored in the memory device 76 shown in FIG. 1. In the present embodiment, the relationship defining data DR is updated by the ε-soft on-policy Monte Carlo method.

That is, the CPU 72 adds the reward r to respective returns R(Sj, Aj), which are determined by pairs of the states obtained through the process of S60 and actions corresponding to the respective states (S68). R(Sj, Aj) collectively represents the returns R each having one of the elements of the state set Sj as the state and one of the elements of the action set Aj as the action. Next, the CPU 72 averages each of the returns R(Sj, Aj), which are determined by pairs of the states and the corresponding actions obtained through the process of S60, and assigns the averaged values to the corresponding action value functions Q(Sj, Aj) (S70). The averaging process simply needs to be a process of dividing the return R, which is calculated through the process of S68, by a number obtained by adding a predetermined number to the number of times the process S68 has been executed. The initial value of the return R simply needs to be set to the initial value of the corresponding action value function Q.

Next, for each of the states obtained through the process of S60, the CPU 72 assigns, to an action Aj*, an action that is the combination of the throttle command value TA* and the retardation amount aop when the corresponding action value function Q(Sj, A) has the maximum value (S72). The sign A represents an arbitrary action that can be taken. Although the action Aj* can have different values depending on the type of the state obtained through the process of S60. However, in view of simplification, the action Aj* has the same sign regardless of the type of the state in the present description.

Next, the CPU 72 updates the policy π corresponding to each of the states obtained through the process of S60 (S74). That is, the CPU 72 sets the selection probability of the action Aj* selected through S72 to $(1-\varepsilon)+\varepsilon/|A|$, where $|A|$ represents the total number of actions. The number of the actions other than the action Aj* is represented by $|A|-1$. The CPU 72 sets the selection probability of each of the actions other than the action Aj* to $\varepsilon/|A|$. The process of S74 is based on the action value function Q, which has been updated through the process of S70. Accordingly, the relationship defining data DR, which defines the relationship between the state s and the action a, is updated to increase the return R.

When the process of step S74 is completed, the CPU 72 temporarily suspends the series of processes shown in FIG. 4.

Referring back to FIG. 3, the CPU 72 temporarily suspends the series of processes shown in FIG. 3 when the process of S50 is completed or when a negative determination is made in any of the processes of S40, S44, and S48. The processes of S30 to S48 are implemented by the CPU 72 executing the control program 74a, and the processes of S48, S50 are implemented by the CPU 72 executing the learning program 74b. The relationship defining data DR at the shipment of the vehicle VC1 is learned in advance through the process similar to the process shown in FIG. 3, for example, by simulating traveling of the vehicle VC1 on the test bench.

Figure 5:
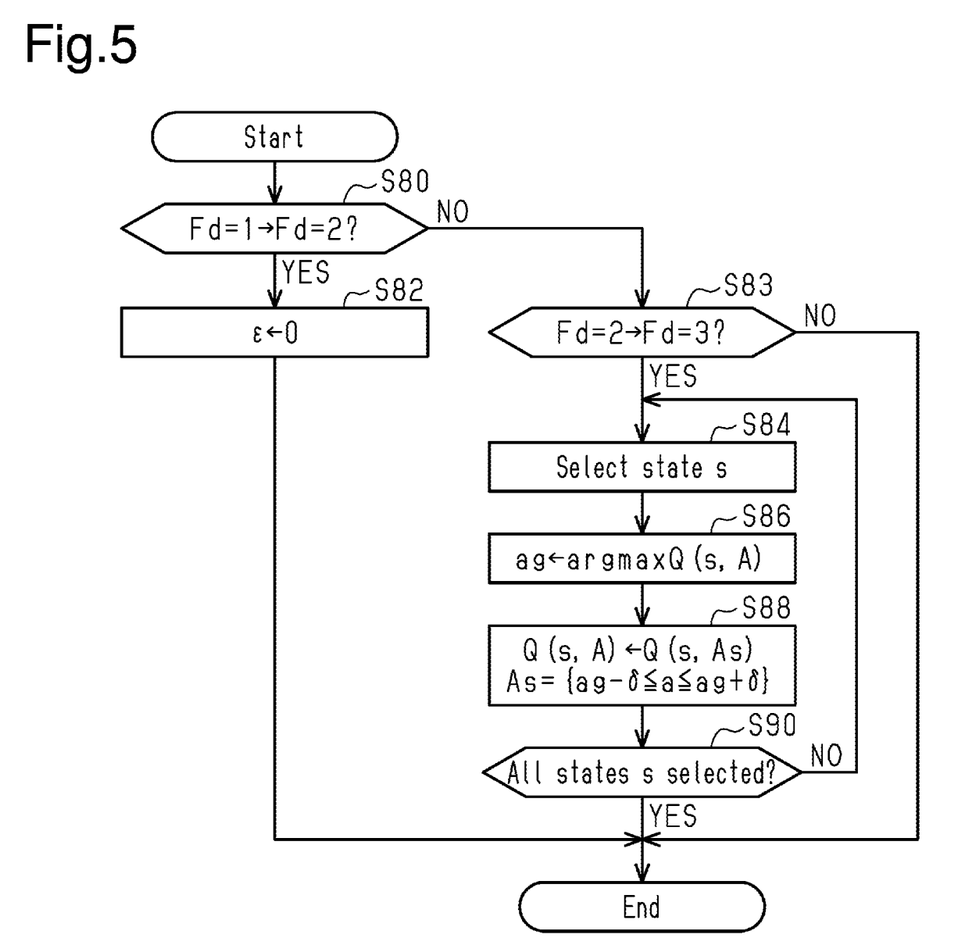
FIG. 5 is a flowchart showing a procedure of processes executed by the controller according to the first embodiment.

FIG. 5 shows a procedure of processes executed by the controller 70. The processes shown in FIG. 5 are implemented by the CPU 72 repeatedly executing the learning program 74b stored in the ROM 74, for example, at predetermined intervals.

In the series of processes shown in FIG. 5, the CPU 72 first determines whether the deterioration flag Fd has now been changed from 1 to 2 (S80). When determining that the deterioration flag Fd has now been changed from 1 to 2 (S80: YES), the CPU 72 assigns 0 to ε, thereby reducing the probability that an action other than the greedy action will be selected to zero (S82).

When making a negative determination in the process of S80, the CPU 72 determines whether the deterioration flag Fd has now been changed from 2 to 3 (S83). When determining that the deterioration flag Fd has now been changed from 2 to 3 (S83: YES), the CPU 72 selects one of the states s, which are defined as independent variables of the action value function Q (S84). Next, the CPU 72 assigns, to a greedy action ag, the action a of the time at which the value of the action value function Q is maximized. The value of the independent variable of the action value function Q is the state s selected through the process of S84 (S86). The CPU 72 limits a set As of the actions a that can be taken in the state s selected through the process of S84 to actions a of which the absolute value of the difference from the greedy action ag is less than or equal to a predetermined value δ (S88). The "actions a of which the absolute value of the difference from the greedy action ag is less than or equal to the predetermined value δ" meets the following two conditions. The first condition is that the absolute value of the difference between the throttle command value TA* corresponding to the greedy action ag and the throttle command value TA* corresponding to the action a is less than or equal to a value obtained by multiplying the range of the possible values of the throttle command value TA* by the predetermined value δ. The second condition is that the absolute value of the difference between the retardation amount aop corresponding to the greedy action ag and the retardation amount aop corresponding to the action a is less than or equal to a value obtained by multiplying the range of the possible values of the retardation amount aop by the predetermined value δ. That is, when the range of the possible values of the throttle command value TA* is represented by TAmax, and the expression $0<\delta<1$ is satisfied, the process of S88 is configured such that the absolute value of the difference between the throttle command value TA* and the value indicated by the greedy action (the throttle command value TA* that corresponds to the greedy action ag) is limited to be less than or equal to δ·TAmax. Also, when the range of the possible values of the retardation amount aop is represented by aopmax, the process of S88 is configured such that the absolute value of the difference between the retardation amount aop and the value indicated by the greedy action (the retardation amount aop that corresponds to the greedy action ag) is limited to be less than or equal to δ·aopmax.

When completing the process of S88, the CPU 72 determines whether all the states s that are defined as individual variables of the action value function Q are have been selected through the process of S84 (S90). When determining that there are states s that have not been selected (S90: NO), the CPU 72 returns the process of S84.

In contrast, the CPU 72 temporarily suspends the series of processes shown in FIG. 5 when determining that all the states s have been selected or when making a negative determination in the process of S83.

The operation and advantages of the present embodiment will now be described.

The CPU 72 obtains time-series data of the accelerator operation amount PA as the user operates the accelerator pedal 86, and sets the action a, which includes the throttle command value TA* and the retardation amount aop, according to the policy 7C. Basically, the CPU 72 selects the action a that maximizes the expected return, based on the action value function Q defined by the relationship defining data DR. However, the CPU 72 searches for the action a that maximizes the expected return by selecting, with the predetermined probability $\varepsilon-\varepsilon|A|$, actions other than the action a that maximizes the expected return. This allows the relationship defining data DR to be updated through reinforcement learning as the user drives the vehicle VC1. Thus, the throttle command value TA* corresponding to the accelerator operation amount PA and the retardation amount aop can be set to appropriate values for driving of the vehicle VC1 without excessively increasing the man-hours by skilled workers.

In this manner, the relationship defining data DR keeps being updated as the vehicle VC1 travels after the shipment of the vehicle VC1 until the traveled distance RL exceeds the convergence determination value RLthL. When the traveled distance RL is greater than or equal to the convergence determination value RLthL, the relationship defining data DR is determined to have converged to an optimum value during driving of the vehicle VC1, and ε is set to zero. That is, the search for actions is temporarily prohibited, so that the policy π is changed to a policy that selects only a greedy action.

Even for the same throttle opening degree TA, if deposit accumulates on the throttle valve 14 and the intake passage 12 due to deterioration of the vehicle VC1, the cross-sectional flow area of the intake passage 12 is reduced. This reduces the intake air amount Ga. Thus, when the traveled distance RL largely exceeds the convergence determination value RLthL, and the deterioration of the vehicle VC1 progresses, a deviation of the throttle command value TA* may occur. That is, the throttle command value TA* that maximizes the expected return in accordance with the time-series data of the accelerator operation amount PA may deviate from the value of throttle command value TA* that is determined by the relationship defining data DR at the time when the traveled distance RL becomes the convergence determination value RLthL.

Accordingly, when the traveled distance RL of the vehicle VC1 is greater than or equal to the deterioration threshold RLthH, the CPU 72 of the present embodiment causes the probability that an action other than the greedy action will be taken to a value to be greater than zero. That is, when the traveled distance RL of the vehicle VC1 becomes great, the CPU 72 temporarily prohibits the search that sets the throttle command value TA* and the retardation amount aop of the ignition timing to values other than values maximizing the expected return. Thereafter, the CPU 72 permits the search to be performed if the traveled distance RL is further increased. However, the CPU 72 sets a limitation that reduces the range of actions that can be selected as an action other than the greedy action as compared to a case in which the traveled distance RL is less than or equal to the convergence determination value RLthL. Specifically, the range of the selectable actions is limited such that the absolute value of the difference between the value of the throttle command value TA* indicated by the greedy action and the value of the throttle command value TA* indicated by a selectable action is less than or equal to δ·TAmax, and that the absolute value of the difference between the retardation amount aop indicated by the greedy action and the value of the retardation amount aop indicated by a selectable action is less than or equal to δ·aopmax. This limitation is set in view of the fact that, even if deterioration of the vehicle VC1 changes the greedy action from the one prior to the deterioration of the vehicle VC1, the amount of change of the greedy action is not significantly great. In this manner, the range of the search for actions is limited. This reduces unnecessary searches that use actions that cannot be a greedy action.

The present embodiment described above further has the following advantages.

(1) The search for actions is prohibited when the traveled distance RL is greater than the convergence determination value RLthL and less than the deterioration threshold RLthH. Accordingly, unnecessary searches are prevented from being continued, so that actions other than optimum actions will not be taken.

(2) The traveled distance RL is a deterioration variable that indicates the degree of deterioration of the vehicle VC1. The range of the search for actions is changed in accordance with the traveled distance RL. This allows the deterioration of the vehicle VC1 to be easily quantified.

Second Embodiment

A second embodiment will now be described with reference to FIGS. 6 and 7. Differences from the first embodiment will mainly be discussed.

In the present embodiment, the relationship defining data DR is updated outside the vehicle VC1.

Figure 6:
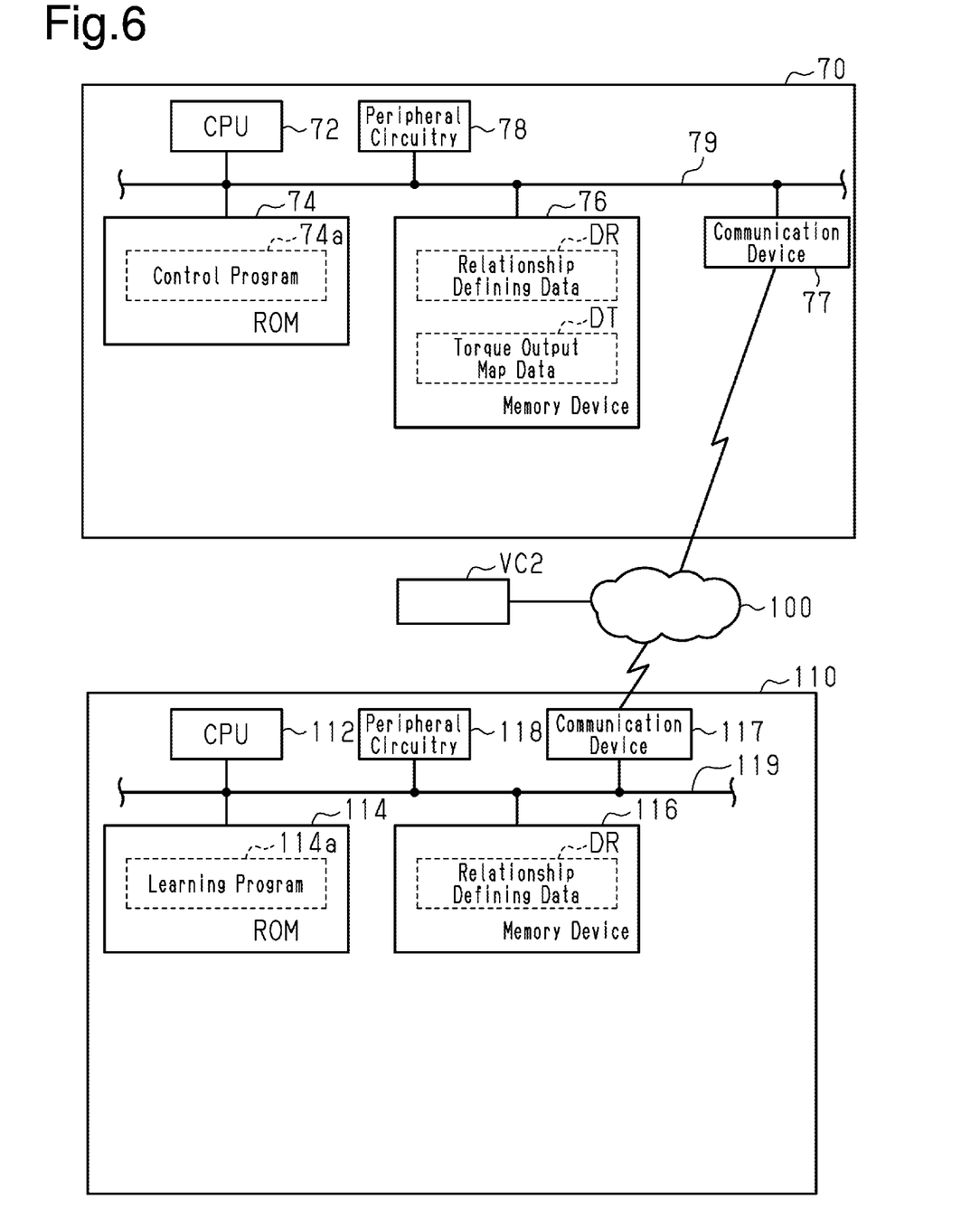
FIG. 6 is a diagram showing the configuration of a vehicle control system according to a second embodiment of the present disclosure.

FIG. 6 shows the configuration of a control system that performs reinforcement learning. In FIG. 6, the same reference numerals are given to the components that are the same as those in FIG. 1 for the illustrative purposes.

The ROM 74 of the controller 70 in the vehicle VC1 shown in FIG. 6 stores the control program 74a, but does not store the learning program 74b. The controller 70 includes a communication device 77. The communication device 77 communicates with a data analysis center 110 via a network 100 outside the vehicle VC1.

The data analysis center 110 analyzes data transmitted from vehicles VC1, VC2, . . . . The data analysis center 110 includes a CPU 112, a ROM 114, a nonvolatile memory that can be electrically rewritten (memory device 116), peripheral circuitry 118, and a communication device 117, which can communicate with each other through a local network 119. The ROM 114 stores a learning program 114a, and the memory device 116 stores the relationship defining data DR.

Figure 7:
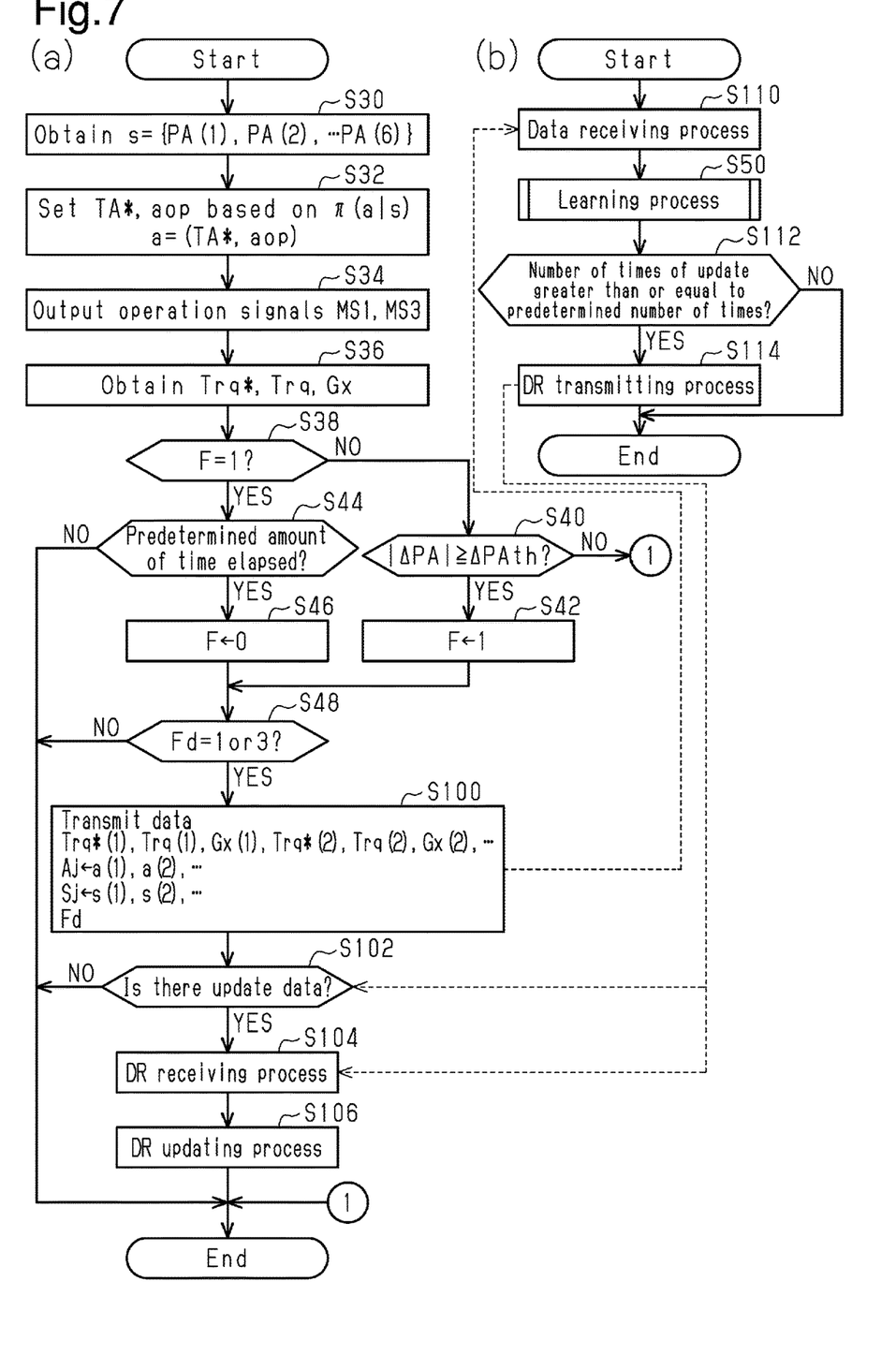
FIG. 7 includes sections (a) and (b), which show a procedure of processes executed by the vehicle control system.

FIG. 7 shows a procedure of processes of reinforcement learning according to the present embodiment. The process shown in a section (a) of FIG. 7 is implemented by the CPU 72 executing the control program 74a stored in the ROM 74 shown in FIG. 6. The process shown in a section (b) of FIG. 7 is implemented by the CPU 112 executing the learning program 114a stored in the ROM 114. In FIG. 7, the same step numbers are given to the processes that correspond to those in FIG. 2. The process shown in FIG. 7 will now be described with reference to the temporal sequence of the reinforcement learning.

In the series of processes shown in the section (a) of FIG. 7, the CPU 72 executes the processes of S30 to S48. When making an affirmative determination in the process of S48, the CPU 72 operates the communication device 77 to transmit data necessary for the update process of the relationship defining data DR (S100). The transmitted data includes the state s set in the process of S30 within a predetermined amount of time, the action a set in the process of S32 within the predetermined amount of time, and the torque command value Trq*, the torque Trq, and the acceleration Gx obtained in the process of S36 within the predetermined amount of time.

As shown in the section (b) of FIG. 7, the CPU 112 receives the data transmitted from the vehicle VC1 (S110), and updates the relationship defining data DR based on the received data (S50). The CPU 112 determines whether the number of times of update of the relationship defining data DR is greater than or equal to a predetermined number of times (S112). When determining that the number of times of update is greater than or equal to the predetermined number of times (S112: YES), the CPU 112 operates the communication device 117 to transmit the relationship defining data DR to the vehicle VC1, which transmitted the data that was received through the process of S110 (S114). When completing the process of S114 or when making a negative determination in the process of S112, the CPU 112 temporarily suspends the series of processes shown in the section (b) of FIG. 7.

As shown in the section (a) of FIG. 7, the CPU 72 determines whether there is update data related to the relationship defining data DR (S102). When determining that there is update data (S102: YES), the CPU 72 receives the updated relationship defining data DR (S104). Then, the CPU 72 rewrites the relationship defining data DR used in the process of S32 with the received relationship defining data DR (s106). When completing the process of S106 or when making a negative determination in the process of any of S40, S44, S48, and S102, the CPU 112 temporarily suspends the series of processes shown in the section (a) of FIG. 7.

As described above, the present embodiment updates the relationship defining data DR outside the vehicle VC1. This reduces the computation load on the controller 70. Further, if the process of S50 is executed by receiving data from multiple vehicles VC1, VC2 in the process of S110, the number of data sets used for learning can be increased easily.

<Correspondence>

The correspondence between the items in the above exemplary embodiments and the items described in the above SUMMARY is as follows. Below, the correspondence is shown for each of the numbers in the examples described in the above SUMMARY.

[1] The execution device corresponds to the CPU 72 and the ROM 74, and the memory device corresponds to the memory device 76.

The state obtaining process corresponds to the processes of S30, S36, and the operation process corresponds to the process of S34.

The reward calculating process corresponds to the processes of S62 to S66, and the update process corresponds to the processes of S68 to S74.

The deterioration variable obtaining process corresponds to the process of S10, and the changing process corresponds to the processes of FIG. 5.

The update map corresponds to the map defined by the command that executes the processes of S68 to S74 in the learning program 74b.

The case in which the degree of deterioration is greater than or equal to the predetermined degree corresponds to the case in which the traveled distance RL is greater than or equal to the deterioration threshold RLthH. A range in which the operation process uses, as the action variable, a value different from the value of an action a that maximizes the expected return related to the reward (greedy action) is referred to as a return non-maximizing range. In a case in which the traveled distance RL of the vehicle is greater than or equal to the deterioration threshold RLthH, the changing process changes the return non-maximizing range to a side on which the return non-maximizing range is expanded as compared to a case in which the traveled distance RL is less than the deterioration threshold RLthH.

[2] Aspect 2 corresponds to the process of S88.

[3] The first range corresponds to all the actions examined in the process of S86.

The second range corresponds to zero.

The third range corresponds to the range that is set through the process of S88.

[4]-[6] The first execution device corresponds to the CPU 72 and the ROM 74, and the second execution device corresponds to the CPU 112 and the ROM 114.

[7] The computer corresponds to the CPU 72 of FIG. 1 or the CPUs 72, 112 in FIG. 6.

Other Embodiments

The above-described embodiments may be modified as follows. The above-described embodiments and the following modifications can be combined as long as the combined modifications remain technically consistent with each other.

Regarding Deterioration Variable

The deterioration variable is not limited to the traveled distance RL. For example, in a case in which an air-fuel ratio sensor is provided, the amount of change in the detection value of the air-fuel ratio sensor may be the deterioration variable. Further, when the air-fuel ratio is subjected to an open-loop control and a feedback control, the deterioration variable may be a feedback correction amount of the fuel injection amount of the fuel injection valve 16.

The deterioration variable may be a variable that subdivides a case in which the degree of deterioration is less than a predetermined degree, using a quantity that is positively correlated with the elapsed time. In this case, the degree of deterioration may include the combination of the traveled distance RL, which is used to determine whether the degree of deterioration is greater than or equal to a predetermined degree, and a variable that indicates whether the value of the action value function Q has converged.

Regarding Changing Process

In the above-described embodiments, when the traveled distance RL is greater than the convergence determination value RLthL and less than the deterioration threshold RLthH, only the greedy action is used, and the search is prohibited. The present disclosure is not limited to this. For example, when the traveled distance RL is in such a range, a search may be permitted within a range that is narrower than the range defined through the process of S88.

As discussed in the Regarding Computer section below, the changing process may be configured such that a search is prohibited at the shipment of the product, and that search is started when the degree of deterioration becomes greater than or equal to a predetermined degree.

Regarding Action Variable

In the above-described embodiments, the throttle command value TA* is used as an example of the variable related to the opening degree of a throttle valve, which is an action variable. However, the present disclosure is not limited to this. For example, the responsivity of the throttle command value TA* to the accelerator operation amount PA may be expressed by dead time and a secondary delay filter, and three variables, which are the dead time and two variables defining the secondary delay filter, may be used as variables related to the opening degree of the throttle valve. In this case, the state variable is preferably the amount of change per unit time of the accelerator operation amount PA instead of the time-series data of the accelerator operation amount PA.

In the above-described embodiments, the retardation amount aop is used as the variable related to the ignition timing, which is an action variable. However, the present disclosure is not limited to this. For example, the ignition timing, which is corrected by a KCS, may be used as the variable related to the ignition timing.

In the above-described embodiments, the variable related to the opening degree of the throttle valve and the variable related to the ignition timing are used as examples of action variables. However, the present disclosure is not limited to this. For example, the variable related to the opening degree of the throttle valve and the variable related to the ignition timing may be replaced by the fuel injection amount. With regard to these three variables, only the variable related to the opening degree of the throttle valve or the fuel injection amount may be used as the action variable. Alternatively, only the variable related to the ignition timing and the fuel injection amount may be used as the action variables. Only one of the three variables may be used as the action variable.

As described in the Regarding Internal Combustion Engine section below, in the case of a compression ignition internal combustion engine, a variable related to an injection amount simply needs to be used in place of the variable related to the opening degree of the throttle valve, and a variable related to the injection timing may be used in place of the variable related to the ignition timing. In addition to the variable related to the injection timing, it is preferable to use a variable related to the number of times of injection within a single combustion cycle and a variable related to the time interval between the ending point in time of one fuel injection and the starting point in time of the subsequent fuel injection for a single cylinder within a single combustion cycle.

For example, in a case in which the transmission 50 is a multi-speed transmission, the action variable may be the value of the current supplied to the solenoid valve that adjusts the engagement of the clutch using hydraulic pressure.

For example, as described the Regarding Vehicle section below, when a hybrid vehicle, an electric vehicle, or a fuel cell vehicle is used as the vehicle, the action variable may be the torque or the output of the rotating electric machine. Further, when the present disclosure is employed in a vehicle equipped with an air conditioner that includes a compressor, and the compressor is driven by the rotational force of the engine crankshaft, the action variable may include the load torque of the compressor. When the present disclosure is employed in a vehicle equipped with a motor-driven air conditioner, the action variables may include the power consumption of the air conditioner.

Regarding State

In the above-described embodiments, the time-series data of the accelerator operation amount PA includes six values that are sampled at equal intervals. However, the present disclosure is not limited to this. The time-series data of the accelerator operation amount PA may be any data that includes two or more values sampled at different sampling points in time. It is preferable to use data that includes three or more sampled values or data of which the sampling interval is constant.

The state variable related to the accelerator operation amount is not limited to the time-series data of the accelerator operation amount PA. For example, as described in the Regarding Action Variable section above, the amount of change per unit time of the accelerator operation amount PA may be used.

For example, when the current value of the solenoid valve is used as the action variable as described in the Regarding Action Variable section above, the state simply needs to include the rotation speed of the input shaft 52 of the transmission, the rotation speed of the output shaft 54, and the hydraulic pressure regulated by the solenoid valve. Also, when the torque or the output of the rotating electric machine is used as the action variable as described in the Regarding Action Variable section above, the state simply needs to include the state of charge and the temperature of the battery. Further, when the action includes the load torque of the compressor or the power consumption of the air conditioner, the state simply needs to include the temperature in the passenger compartment.

Regarding Reduction of Dimensions of Table-Type Data

The method of reducing the dimensions of table-type data is not limited to the one in the above-described embodiments. The accelerator operation amount PA rarely reaches the maximum value. Accordingly, the action value function Q does not necessarily need to be defined for the state in which the accelerator operation amount PA is greater than or equal to the specified amount, it is possible to adapt the throttle command value TA* and the like independently when the accelerator operation amount PA is greater than or equal to the specified value. The dimensions may be reduced by removing, from possible values of the action, values at which the throttle command value TA* is greater than or equal to the specified value.

Regarding Relationship Defining Data

In the above-described embodiments, the action value function Q is a table-type function. However, the present disclosure is not limited to this. For example, a function approximator may be used.

For example, instead of using the action value function Q, the policy $\pi$ may be expressed by a function approximator that uses the state s and the action a as independent variables and uses the probability that the action a will be taken as a dependent variable. In this case, parameters defining the function approximator may be updated in accordance with the reward r.

Regarding Operation Process

For example, when using a function approximator as the action value function Q as described in the Regarding Relationship Defining Data section above, all the groups of discrete values related to actions that are independent variables of the table-type function of the above-described embodiments simply need to be input to the action value function Q together with the state s, so as to select the action a that maximizes the action value function Q.

For example, when the policy $\pi$ is a function approximator that uses the state s and the action a as independent variables, and uses the probability that the action a will be taken as a dependent variable as in the Regarding Relationship Defining Data section above, the action a simply needs to be selected based on the probability indicated by the policy 7C.

Regarding Update Map

The ε-soft on-policy Monte Carlo method is executed in the process of S68 to S74. However, the present disclosure is not limited to this. For example, an off-policy Monte Carlo method may be used. Also, methods other than Monte Carlo methods may be used. For example, an off-policy TD method may be used. An on-policy TD method such as a SARSA method may be used. Alternatively, an eligibility trace method may be used as an on-policy learning.

For example, when the policy $\pi$ is expressed using a function approximator, and the function approximator is directly updated based on the reward r, the update map is preferably constructed using, for example, a policy gradient method.

The present disclosure is not limited to the configuration in which only one of the action value function Q and the policy $\pi$ is directly updated using the reward r. For example, the action value function Q and the policy $\pi$ may be separately updated as in an actor critic method. In an actor critic method, the action value function Q and the policy $\pi$ do not necessarily need to be updated. For example, in place of the action value function Q, a value function V may be updated.

Regarding Reward Calculating Process

In the above-described embodiments, the reward is provided depending on whether the logical disjunction of the conditions (i) and (ii) is true. However, the present disclosure is not limited to this. For example, it is possible to execute a process that provides the reward depending on whether the condition (i) is met and a process that provides the reward depending on whether the condition (ii) is met.

For example, instead of providing the same reward without exception when the condition (i) is met, a process may be executed in which a greater reward is provided when the absolute value of the difference between the torque Trq and the torque command value Trq* is small than when the absolute value is great. Also, instead of providing the same reward without exception when the condition (i) is not met, a process may be executed in which a smaller reward is provided when the absolute value of the difference between the torque Trq and the torque command value Trq* is great than when the absolute value is small.

For example, instead of providing the same reward without exception when the condition (ii) is met, a process may be executed in which the reward is varied in accordance with the acceleration Gx. Also, instead of providing the same reward without exception when the condition (ii) is not met, a process may be executed in which the reward is varied in accordance with the acceleration Gx.

The reward calculating process is not limited to the process that provides the reward r depending whether the standard related to drivability is met. The reward calculating process may be a process that provides a greater reward, for example, when the energy use efficiency meets a standard than when the energy use efficiency does not meet the standard. Further, the reward calculating process may be a process that provides a greater reward, for example, when the exhaust characteristic meets a standard than when the exhaust characteristic does not meet the standard. The reward calculating process may include two or three of the following processes: the process that provides a greater reward when the standard related to drivability is met than when the standard is not met; the process that provides a greater reward when the energy use efficiency meets the standard than when the energy use efficiency does not meet the standard; and the process that provides a greater reward when the exhaust characteristic meets the standard than when the exhaust characteristic does not meet the standard.

For example, when the current value of the solenoid valve of the transmission 50 is used as the action variable as described in the Regarding Action Variable section above, the reward calculating process simply needs to include one of the three processes (a) to (c).

(a) A process that provides a greater reward when time required for the transmission to change the gear ratio is within a predetermined time than when the required time is exceeds the predetermined time.

(b) A process that provides a greater reward when the absolute value of the rate of change of the rotation speed of the transmission input shaft 52 is less than or equal to an input-side predetermined value than when the absolute value exceeds the input-side predetermined value.

(c) A process that provides a greater reward when the absolute value of the rate of change of the rotation speed of the transmission output shaft 54 is less than or equal to an output-side predetermined value than when the absolute value exceeds the output-side predetermined value.

Also, when the torque or the output of the rotating electric machine is used as the action variable as described in the Regarding Action Variable section above, the reward calculating process may include the following processes: a process that provides a greater reward when the state of charge of the battery is within a predetermined range than when the state of charge is out of the predetermined range; and a process that provides a greater reward when the temperature of the battery is within a predetermined range than when the temperature is out of the predetermined range. Further, when the action variable includes the load torque of the compressor or the power consumption of the air conditioner as described in the Regarding Action Variable section above, the reward calculating process may include the following process: a process that provides a greater reward when the temperature in the passenger compartment is within a predetermined range than when the temperature is out of the predetermined range.

Regarding Vehicle Control System

In the processes of FIG. 7, the processes of S50 are all executed in the data analysis center 110. However, the present disclosure is not limited to this. For example, the processes of S62 to S66 of the process of S50 may be executed on the side of the vehicle VC1, and part of the process of S100 in the section (a) of FIG. 7 may be changed such that the calculation result of the reward r is transmitted from the vehicle VC1 to the data analysis center 110.

The vehicle control system does not necessarily include the controller 70 and the data analysis center 110. For example, the vehicle control system may include a portable terminal carried by a user in place of the data analysis center 110, so that the vehicle control system includes the controller 70 and the portable terminal. Also, the vehicle control system may include the controller 70, a portable terminal, and the data analysis center 110. This configuration is achieved by the portable terminal executing the process of S32 in FIG. 7.

Regarding Execution Device

The execution device is not limited to the device that includes the CPU 72 (112) and the ROM 74 (114) and executes software processing. For example, at least part of the processes executed by the software in the above-described embodiments may be executed by hardware circuits dedicated to executing these processes (such as ASIC). That is, the execution device may be modified as long as it has any one of the following configurations (a) to (c). (a) A configuration including a processor that executes all of the above-described processes according to programs and a program storage device such as a ROM (including a non-transitory computer readable memory medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. Multiple software processing devices each including a processor and a program storage device and a plurality of dedicated hardware circuits may be provided.

Regarding Computer

The computer is not limited to the CPU 72 of FIG. 1 or the CPUs 72, 112 in FIG. 6. For example, the computer that generates the relationship defining data DR prior to the shipment of the vehicle VC1 and the CPU 72 mounted on the vehicle VC1 may collectively function as a single computer. In this case, the search may be prohibited at the time of the shipment, and may be permitted when the traveled distance RL becomes greater than or equal to the deterioration threshold RLthH. The range of the search that is permitted when the traveled distance RL becomes greater than or equal to the deterioration threshold RLthH is preferably configured such that the range of the possible values of the action variable is smaller than that in the search in the reinforcement learning that is performed by a computer to generate the relationship defining data DR. In the process of generating the relationship defining data DR prior to the shipment of the vehicle, the state of the vehicle may be virtually generated, without the actual vehicle, by operating the internal combustion engine 10 and the like on the test bench, thereby simulating traveling of the vehicle. The state of the vehicle, which is virtually generated by detection values of sensors and the like, may be obtained and used in the reinforcement learning. In this case, the virtually generated state of the vehicle is regarded as the state of the vehicle based on the sensor values.

Regarding Memory Device

In the above-described embodiments, the memory device storing the relationship defining data DR and the memory device (ROM 74) storing the learning program 74b and the control program 74a are separate from each other. However, the present disclosure is not limited to this.

Regarding Internal Combustion Engine

The internal combustion engine does not necessarily include, as the fuel injection valve, a port injection valve that injects fuel to the intake passage 12, but may include a direct injection valve that injects fuel into the combustion chamber 24. Further, the internal combustion engine may include a port injection valve and a direct injection valve.

The internal combustion engine is not limited to a spark-ignition engine, but may be a compression ignition engine that uses, for example, light oil or the like.

Regarding Vehicle

The vehicle is not limited to a vehicle that includes only an internal combustion engine as a propelling force generator, but may be a hybrid vehicle includes an internal combustion engine and a rotating electric machine. Further, the vehicle may be an electric vehicle or a fuel cell vehicle that includes a rotating electric machine as the propelling force generator, but does not include an internal combustion engine.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle controller, comprising:
an execution device; and
a memory device, wherein
the memory device stores relationship defining data that defines a relationship between a state of a vehicle and an action variable related to an operation of an electronic device mounted on the vehicle,
the execution device is configured to execute
a state obtaining process that obtains the state of the vehicle at each moment based on a detection value of a sensor at each moment,
an operation process that operates the electronic device based on a value of the action variable, the value of the action variable being determined by the relationship defining data and the state of the vehicle obtained by the state obtaining process,
a reward calculating process that provides, based on the state of the vehicle obtained by the state obtaining process, a greater reward when a characteristic of the vehicle meets a standard than when the characteristic of the vehicle does not meet the standard,
an update process that updates the relationship defining data by inputting, to a predetermined update map, the state of the vehicle obtained by the state obtaining process, the value of the action variable used to operate the electronic device, and the reward corresponding to the operation of the electronic device,
a deterioration variable obtaining process that obtains a deterioration variable, the deterioration variable indicating a degree of deterioration of the vehicle, and
a changing process, wherein a range in which the operation process uses, as the action variable, a value different from a value that maximizes an expected return related to the reward is defined as a return non-maximizing range, and, in a case in which the degree of deterioration of the vehicle is greater than or equal to a predetermined degree, the changing process changes the return non-maximizing range to a side on which the return non-maximizing range is expanded as compared to a case in which the degree of deterioration is less than the predetermined degree, and
the update map outputs the updated relationship defining data so as to increase the expected return of a case in which the electronic device is operated in accordance with the relationship defining data.

2. The vehicle controller according to claim 1, wherein the changing process includes a process that increases the return non-maximizing range from zero to a range greater than zero.

3. The vehicle controller according to claim 2, wherein
the deterioration variable subdivides a case in which the degree of deterioration is less than a predetermined degree, using a quantity that is positively correlated with elapsed time,
the changing process changes the return non-maximizing range from a first range to a third range via a second range as time elapses,
the first range is greater than the second range and the third range,
the third range is greater than the second range, and
in a case in which the degree of deterioration of the vehicle is greater than or equal to the predetermined degree, the changing process changes the return non-maximizing range to a side on which the return non-maximizing range is expanded from the second range to the third range.

4. A vehicle control system, comprising the execution device and the memory device in the vehicle controller according to claim 1, wherein
the execution device includes a first execution device mounted on the vehicle and a second execution device that is different from an in-vehicle device, the first execution device is configured to execute at least the state obtaining process and the operation process, and the second execution device is configured to execute at least the update process.

5. A vehicle controller, comprising the first execution device in the vehicle control system according to claim 4.

6. A vehicle learning device, comprising the second execution device in the vehicle control system according to claim 4.

7. A vehicle learning method, the method comprising: causing a computer to execute the state obtaining process, the operation process, the reward calculating process, the update process, the deterioration variable obtaining process, and the changing process in the vehicle controller according to claim 1.

8. A vehicle control method that is performed by an execution device and a memory device, the vehicle control method comprising:

using the memory device to store relationship defining data that defines a relationship between a state of a vehicle and an action variable related to an operation of an electronic device mounted on the vehicle; and using the execution device to obtain the state of the vehicle at each moment based on a detection value of a sensor at each moment, operate the electronic device based on a value of the action variable, the value of the action variable being determined by the relationship defining data and the obtained state of the vehicle, provide, based on the obtained state of the vehicle, a greater reward when a characteristic of the vehicle meets a standard than when the characteristic of the vehicle does not meet the standard, update the relationship defining data by inputting, to a predetermined update map, the obtained state of the vehicle, the value of the action variable used to operate the electronic device, and the reward corresponding to the operation of the electronic device, obtain a deterioration variable, the deterioration variable indicating a degree of deterioration of the vehicle, and define, as a return non-maximizing range, a range in which a value different from a value that maximizes an expected return related to the reward is used as the action variable, and in a case in which the degree of deterioration of the vehicle is greater than or equal to a predetermined degree, change the return non-maximizing range to a side on which the return non-maximizing range is expanded as compared to a case in which the degree of deterioration is less than the predetermined degree, and the update map outputs the updated relationship defining data so as to increase the expected return of a case in which the electronic device is operated in accordance with the relationship defining data.

9. A non-transitory computer readable medium that stores a vehicle control process executed by an execution device and a memory device, the vehicle control process comprises:

using the memory device to store relationship defining data that defines a relationship between a state of a vehicle and an action variable related to an operation of an electronic device mounted on the vehicle; and using the execution device to:

obtain the state of the vehicle at each moment based on a detection value of a sensor at each moment, operate the electronic device based on a value of the action variable, the value of the action variable being determined by the relationship defining data and the obtained state of the vehicle, provide, based on the obtained state of the vehicle, a greater reward when a characteristic of the vehicle meets a standard than when the characteristic of the vehicle does not meet the standard, update the relationship defining data by inputting, to a predetermined update map, the obtained state of the vehicle, the value of the action variable used to operate the electronic device, and the reward corresponding to the operation of the electronic device, obtain a deterioration variable, the deterioration variable indicating a degree of deterioration of the vehicle, and define, as a return non-maximizing range, a range in which a value different from a value that maximizes an expected return related to the reward is used as the action variable, and in a case in which the degree of deterioration of the vehicle is greater than or equal to a predetermined degree, change the return non-maximizing range to a side on which the return non-maximizing range is expanded as compared to a case in which the degree of deterioration is less than the predetermined degree, and wherein the update map outputs the updated relationship defining data so as to increase the expected return of a case in which the electronic device is operated in accordance with the relationship defining data.

* * * * *